Figure 1:
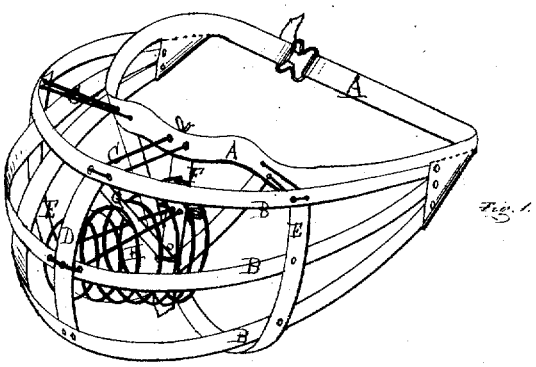
Figure 2:
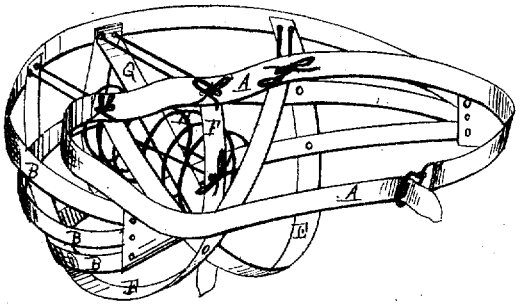

M. K. BORTREE.

Bustles.

No. 5,484. Reissued July 15, 1873.

ATTEST:
H. Sprague
Theo. S. Day

INVENTOR
Moses K. Bortree
By atty —
Thos. S. Sprague

AM. PHOTO-LITHOGRAPHIC CO. N.Y. (OSBORNE'S PROCESS.)

UNITED STATES PATENT OFFICE.

MOSES K. BORTREE, OF JACKSON, MICHIGAN.

IMPROVEMENT IN BUSTLES.

Specification forming part of Letters Patent No. 136,127, dated February 25, 1873; reissue No. 5,484, dated July 15, 1873; application filed May 17, 1873.

*To all whom it may concern:*

Be it known that I, MOSES K. BORTREE, of Jackson, in the county of Jackson and State of Michigan, have invented a new and useful Improvement in Skeleton Bustles; and I do declare that the following is a true and accurate description thereof, reference being had to the accompanying drawings and to the letters of reference marked thereon and being a part of this specification, in which my invention is shown in perspective in two views, front and rear.

The nature of this invention relates to the construction of an adjustable bustle, so made that, at the desire of the wearer, it may be compressed or extended to suit the taste or different styles of dress. The invention consists in the peculiar construction and arrangement of the various parts, as more fully hereinafter described.

In the accompanying drawing, A represents a band provided with suitable buckle or other device to enable the wearer to secure it to and around her body. To this band, so that the connection will be made therewith nearly over the hips of the wearer, are secured the diverging and converging springs B, in such a manner as to project beyond the rear of the band, to which the upper spring is also secured, by the adjusting-cords C, in such a manner that lengthening or shortening the cords will expand or depress the springs, each of which may be provided with similar cords, if desired. An expander, D, is secured at the middle of the length of the springs B to hold them in their position relatively to each other. Other springs E are similarly secured to the springs B about midway between the expander D and their ends. These springs E are continued below the lower spring B, turned with a curve forward and upward, and, crossing each other, their ends are secured to the band A. A brace, F, is secured at one end to the band, and at the other to the springs E at their point of intersection. From the upper spring B there extends downward and forward an adjusting strap or tape, G, secured at its lower end, at the point of intersection of the springs E, by means of a buckle (not shown) or other similar device. By this means the horizontal plane of the upper spring B may be adjusted at will. A coiled or spiral spring, H, is interposed between the triangle made by the springs E and brace F and the center one of the springs B, to give greater elasticity to the whole, and enable it to sustain the greater weight of some dresses.

As the inner end of the spiral or coil spring H rests upon the point of intersection of the springs E, the brace F may be omitted in the construction of the bustle, if desired, rendering it lighter. In bustles for heavy or light dresses there may be more or less than three of the springs B employed, according to the weight of the dresses to be worn with them.

What I claim as my invention, and desire to secure by Letters Patent, is—

1. In a bustle constructed substantially as herein described, the adjusting-cords C, in combination with the band A and springs B, arranged to operate substantially as set forth.

2. The combination of the band A, springs B, adjusting-cords C, and springs E, when the parts are arranged substantially as and for the purposes set forth.

3. The combination of the band A and springs B and E, arranged as shown, with the spiral or coil spring H, substantially as described and for the purposes specified.

4. The arrangement of the band A, springs B, adjusting-cords C, expander D, and springs E, substantially as and for the purposes described.

5. The arrangement of the band A, springs B, adjusting-cords C, expander D, springs E, with the brace F and spring H, substantially as and for the purposes set forth.

6. The combination and arrangement of the band A, springs B, adjusting-cords C, expander D, springs E, brace F, and adjusting-strap G, substantially as described and for the purposes set forth.

7. The combination of the adjusting-strap G with the band A, springs B and E, and coil-spring H, substantially as and for the purposes described.

MOSES K. BORTREE.

Witnesses:

H. S. SPRAGUE,

CHAS. E. HUESTIS.